US012235665B2

(12) United States Patent
Yamamoto

(10) Patent No.: US 12,235,665 B2
(45) Date of Patent: Feb. 25, 2025

(54) SEMICONDUCTOR CIRCUIT AND POWER SUPPLY DEVICE

(71) Applicant: Kioxia Corporation, Tokyo (JP)

(72) Inventor: Takaya Yamamoto, Taito Tokyo (JP)

(73) Assignee: KIOXIA CORPORATION (JP)

( * ) Notice: Subject to any disclaimer, the term of this patent is extended or adjusted under 35 U.S.C. 154(b) by 189 days.

(21) Appl. No.: 17/901,064

(22) Filed: Sep. 1, 2022

(65) Prior Publication Data

US 2023/0195150 A1 Jun. 22, 2023

(30) Foreign Application Priority Data

Dec. 17, 2021 (JP) ................................ 2021-205446

(51) Int. Cl.
*G05F 1/56* (2006.01)

(52) U.S. Cl.
CPC ...................................... *G05F 1/56* (2013.01)

(58) Field of Classification Search
CPC . G05F 1/56; G05F 1/575; G05F 1/565; G05F 1/467; G05F 1/462
See application file for complete search history.

(56) References Cited

U.S. PATENT DOCUMENTS 7,091,709 B2 * 8/2006 Suzuki .................... G05F 1/575 323/281
8,513,929 B2 * 8/2013 Drebinger ............... G05F 1/575 327/543
9,024,602 B2 * 5/2015 Fort .......................... G05F 1/46 323/280
9,983,604 B2 * 5/2018 Lee ......................... G05F 1/575
11,036,247 B1 * 6/2021 Wei ......................... G05F 1/575

FOREIGN PATENT DOCUMENTS

JP 4029812 B2 1/2008
JP 4838760 B2 12/2011
JP 5092009 B2 12/2012

OTHER PUBLICATIONS

Bangda Yang et.al. "A High-PSR LDO using a Feedforward Supply-Noise Cancellation Technique", 2011 IEEE Custom Integrated Circuits Conference (CICC), Sep. 19-21, 2011; 4 pages.
Mohamed El-Nozahi et.al. "High PSR Low Drop-Out Regulator With Feed-Forward Ripple Cancellation Technique", IEEE Journal of Solid-State Circuits, vol. 45, No. 3, Mar. 2010; 13 pages.

* cited by examiner

*Primary Examiner* — Nguyen Tran
*Assistant Examiner* — Naomi Carrier
(74) *Attorney, Agent, or Firm* — FOLEY & LARDNER LLP

(57) ABSTRACT

A semiconductor circuit includes: a first transistor connected between a first node configured to input an input voltage and a second node configured to output an output voltage; a cascode connection circuit including a plurality of second transistors connected in a cascode configuration between the first node and a third node set at a first voltage; a first capacitor connected between the second node and a fourth node of a first one of the plurality of second transistors; and a second capacitor connected between the first node and the fourth node, wherein a fifth node of the first second transistor is connected to a gate of the first transistor.

10 Claims, 4 Drawing Sheets

1a(10a)

1 (10)

100

1a(10a)

SEMICONDUCTOR CIRCUIT AND POWER SUPPLY DEVICE

CROSS-REFERENCE TO RELATED APPLICATION(S)

This application is based upon and claims the benefit of priority from Japanese Patent Application No. 2021-205446, filed Dec. 17, 2021, the entire contents of which are incorporated herein by reference.

FIELD

Embodiments described herein relate generally to a semiconductor circuit and a power supply device.

BACKGROUND

In general, a low drop-out (LDO) regulator can reduce fluctuations in an output voltage even when an input voltage or a load current fluctuates. The characteristics of the LDO regulator include power supply rejection (PSR) characteristics. PSR characteristics refer to AC gain characteristics of an output voltage with respect to an input voltage. For an LDO regulator, it is desirable to minimize its PSR characteristics.

Parasitic capacitance is added to the gate of a pass transistor provided at the final stage of the LDO regulator, which could cause the PSR characteristics to deteriorate. The PSR characteristics can be improved by making AC gain of a gate signal of the pass transistor with respect to an input voltage have a peak in a frequency band where the PSR characteristics deteriorates. This, however, could make the power-supply conductance of the pass transistor shift to the negative side, causing an output signal of the LDO regulator to oscillate.

DETAILED DESCRIPTION

Figure 1:
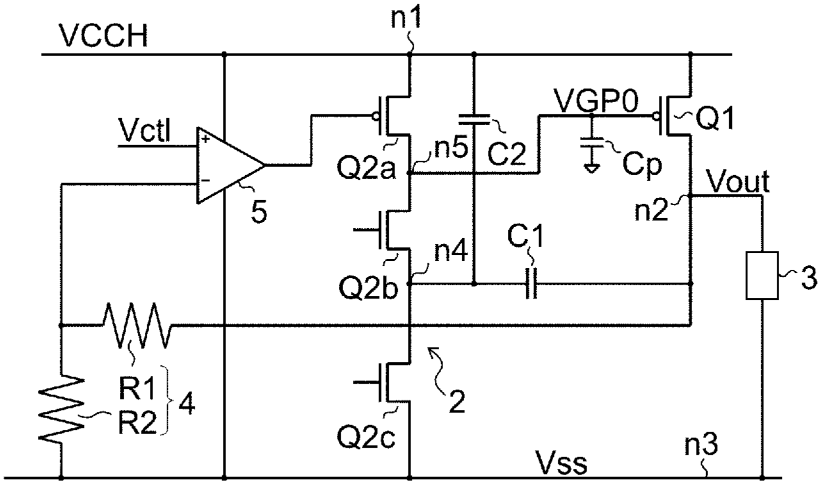
FIG. 1 is a circuit diagram of a power supply device according to a first embodiment.

Embodiments provide a semiconductor circuit and a power supply device which can improve PSR characteristics.

In general, according to one embodiment, provided is a semiconductor circuit including: a first transistor connected between a first node configured to input an input voltage and a second node configured to output an output voltage; a cascode connection circuit including a plurality of second transistors connected in a cascode configuration between the first node and a third node set at a first voltage; a first capacitor connected between the second node and a fourth node of a first one of the plurality of second transistors; and a second capacitor connected between the first node and the fourth node, wherein a fifth node of the first second transistor is connected to a gate of the first transistor.

Hereinafter, embodiments of a semiconductor circuit and a power supply device will be described with reference to the drawings. The following description deals mainly with principal components of the semiconductor circuit and the power supply device. It is to be noted that the semiconductor circuit and the power supply device may have other components and functions that are not illustrated in the drawings or not contained in the description and the following description is not intended to exclude these components and functions.

First Embodiment

FIG. 1 is a circuit diagram of a power supply device 1 according to a first embodiment. The power supply device 1 of FIG. 1 can be implemented as a semiconductor circuit 10 that is formed on a semiconductor substrate. This semiconductor circuit 10 can also constitute a semiconductor device by being packaged with other semiconductor circuits that are formed on the same semiconductor substrate.

The power supply device 1 includes a first transistor Q1, a cascode connection circuit 2, a first capacitor C1, a second capacitor C2, a first node n1, a second node n2, and a third node n3. The power supply device 1 is also called an LDO regulator and can output an output voltage Vout at a voltage level close to the voltage level of an input voltage VCCH. A load circuit 3 can be connected to the second node n2.

The input voltage VCCH is input to the first node n1. The input voltage VCCH is a power supply voltage of the power supply device 1, for example. In the following description, the first node n1 is sometimes referred to as the input voltage node n1. The second node n2 outputs the output voltage Vout of the power supply device 1. In the following description, the second node n2 is sometimes referred to as the output voltage node n2.

A reference voltage is input to the third node n3. The reference voltage corresponds to a reference potential at the time of operation of the power supply device 1 and is a grounding voltage (0 V), for example. In the following description, the third node n3 is sometimes referred to as the grounding voltage node n3.

The input voltage VCCH, the output voltage Vout, and the reference voltage each have any voltage level. The power supply device 1 according to the present embodiment can reduce fluctuations in the output voltage Vout and prevent oscillations of the output voltage Vout even when the input voltage VCCH fluctuates or a load current flowing through the load circuit 3 fluctuates.

The first transistor Q1 is connected between the input voltage node n1 and the output voltage node n2. In the following description, the first transistor Q1 is sometimes referred to as the pass transistor Q1. The pass transistor Q1 is a PMOS transistor. The source of the pass transistor Q1 is connected to the input voltage node n1 and the drain of the pass transistor Q1 is connected to the output voltage node n2. A gate voltage of the pass transistor Q1 is controlled in accordance with, for example, the potential difference between a voltage correlated with the output voltage Vout of the power supply device 1 and a control voltage Vctl. The voltage correlated with the output voltage Vout is a divided voltage of the output voltage Vout, for example.

The cascode connection circuit 2 includes a plurality of second transistors Q2 that are connected in a cascode configuration between the input voltage node n1 and the grounding voltage node n3. The plurality of second transistors Q2 may include a transistor of a first conductivity type and a transistor of a second conductivity type. In an example of FIG. 1, the cascode connection circuit 2 includes a PMOS transistor Q2*a*, an NMOS transistor Q2*b*, and an NMOS transistor Q2*c* that are connected in order in a cascode configuration between the input voltage node n1 and the grounding voltage node n3. In the present specification, the transistors Q2*a*, Q2*b*, and Q2*c* in the cascode connection circuit 2 are sometimes collectively referred to as the second transistors Q2.

The number of stages at which the second transistors Q2 are connected in the cascode connection circuit 2 is freely selected. The cascode connection circuit 2 of FIG. 1 includes one PMOS transistor Q2*a* and two NMOS transistors Q2*b* and Q2*c*; the cascode connection circuit 2 of FIG. 1 may include two or more PMOS transistors Q2 and three or more NMOS transistors Q2.

The source of the PMOS transistor Q2*a* in the cascode connection circuit 2 is connected to the input voltage node n1 and the drain of the PMOS transistor Q2*a* is connected to the drain of the NMOS transistor Q2*b* and is connected to the gate of the pass transistor Q1. The source of the NMOS transistor Q2*b* is connected to the drain of the NMOS transistor Q2*c*. The source of the NMOS transistor Q2*c* is connected to the grounding voltage node n3.

As described above, the drains of the transistors Q2*a* and Q2*b* of different conductivity types in the cascode connection circuit 2 are connected to the gate of the pass transistor Q1.

The first capacitor C1 is connected between the output voltage node n2 and a fourth node n4 of one second transistor Q2 (Q2*b*) of the plurality of second transistors Q2. More specifically, in the example of FIG. 1, the first capacitor C1 is connected between the output voltage node n2 and the source of the NMOS transistor Q2*b* and the fourth node n4 is the source of the transistor Q2*b*. One end of the first capacitor C1 is connected to the output voltage node n2 and the other end of the first capacitor C1 is connected to a connection node between the source of the transistor Q2*b* and the drain of the transistor Q2*c*. That is, the fourth node n4 is also a node to which the other end of the first capacitor C1 is connected.

The first capacitor C1 is called mirror compensation capacitance. By providing the first capacitor C1, it is possible to obtain the effect of adding, to the gate of the pass transistor Q1, capacitance obtained by multiplying the capacitance of the first capacitor C1 by gain. This makes it possible to obtain the effect of preventing oscillations by virtually deteriorating the frequency characteristics of the power supply device 1. As will be described later, the first capacitor C1 alone cannot prevent oscillations; therefore, in addition to the first capacitor C1, the power supply device 1 according to the present embodiment takes measures to prevent oscillations.

Multiplication by gain means multiplication by gain of the pass transistor Q1. In the following description, the first capacitor C1 is sometimes referred to as the mirror compensation capacitance C1.

The second capacitor C2 is connected between the fourth node n4 of the above-described one second transistor Q2 (Q2*b*) and the input voltage node n1. More specifically, in the example of FIG. 1, the second capacitor C2 is connected between the source of the NMOS transistor Q2*b* and the input voltage node n1. A fifth node n5 of the second transistor Q2 (Q2*b*) is connected to the gate of the first transistor Q1. The fifth node n5 is the drain of the transistor Q2*b*.

A path connecting both ends of the second capacitor C2 is called an AC path. As will be described later, providing such an AC path makes it possible to improve PSR characteristics without a shift of the power-supply conductance of the pass transistor Q1 to the negative side and prevent oscillations of the output voltage Vout of the power supply device 1. In the following description, the second capacitor C2 is sometimes referred to as the AC path capacitance C2.

In the power supply device 1 according to the present embodiment, the AC path capacitance C2 is set in such a way that the power-supply conductance of the pass transistor Q1 does not shift to the negative side. As will be described later, this prevents oscillations of the output voltage Vout of the power supply device 1.

A second output node of the above-described one second transistor Q2 (Q2*b*) is connected to the gate of the pass transistor Q1. More specifically, in the example of FIG. 1, the drain of the NMOS transistor Q2*b* is connected to the gate of the pass transistor Q1 and the second output node is the drain of the transistor Q2*b*.

As described above, the other end of the mirror compensation capacitance C1 is connected to the source of the second transistor Q2 (Q2*b*) included in the plurality of second transistors Q2 of the cascode connection circuit 2 and having the drain that is connected to the gate of the pass transistor Q1.

In addition to those described above, the power supply device 1 of FIG. 1 includes a voltage divider circuit 4 and a differential amplifier circuit 5. The voltage divider circuit 4 is connected between the output voltage node n2 and the grounding voltage node n3 and generates a divided voltage obtained by dividing the output voltage Vout of the power supply device 1. The voltage divider circuit 4 generates a divided voltage in accordance with the resistance ratio of two resistors R1 and R2. The voltage divider circuit 4 may generate a divided voltage in accordance with the ratio of the numbers of stages of impedance elements other than resistors, for example, a plurality of cascade-connected diodes. As described above, the voltage divider circuit 4 may have any specific configuration.

The differential amplifier circuit 5 and the second transistor Q2 (Q2*b*) supply a voltage in accordance with the potential difference between the divided voltage and the control voltage Vctl to the gate of the pass transistor Q1. The control voltage Vctl is supplied from the outside of the power supply device 1, for example. By controlling the voltage level of the control voltage Vctl, it is possible to control the voltage level of the output voltage Vout of the power supply device 1. The differential amplifier circuit 5 and the second transistor Q2 (Q2*b*) perform negative feedback control in such a way that the divided voltage corresponds to the control voltage Vctl; for this reason, the differential amplifier circuit 5 is also called an error amplifier.

In the power supply device 1, when, for example, the load current flowing through the load circuit 3 decreases, a drain voltage of the pass transistor Q1 increases and the divided voltage that is output from the voltage divider circuit 4 also increases. As a result, the output voltage of the differential amplifier circuit 5 decreases and a source-drain current of the PMOS transistor Q2*a* in the cascode connection circuit 2 increases. Consequently, the gate voltage of the pass transistor Q1 connected to the source of the PMOS transistor Q2*a* increases and a source-drain current of the pass transistor Q1 decreases, whereby an increase in the output voltage Vout is suppressed.

Moreover, in the power supply device 1, when, for example, the input voltage VCCH decreases, the pass transistor Q1 operates in a direction in which the pass transistor Q1 is turned off, and the source-drain current of the pass transistor Q1 decreases. This causes the output voltage Vout that is output from the output voltage node n2 to decrease. Thus, the divided voltage that is output from the voltage divider circuit 4 also decreases and the output voltage of the differential amplifier circuit 5 increases. Consequently, the PMOS transistor Q2*a* in the cascode connection circuit 2 operates in a direction in which the PMOS transistor Q2*a* is turned off, and a drain voltage of the PMOS transistor Q2*a* and the gate voltage of the pass transistor Q1 decrease. Therefore, the pass transistor Q1 operates in a direction in which the pass transistor Q1 is turned on, the source-drain current of the pass transistor Q1 increases, and the output voltage Vout that is output from the output voltage node n2 increases.

With the above-described operations, the output voltage Vout that is output from the output voltage node n2 is controlled so as to be constant even when the load current fluctuates or the input voltage VCCH fluctuates.

As mentioned earlier, in the power supply device 1, parasitic capacitance Cp is added to the gate of the pass transistor Q1. This parasitic capacitance Cp causes an AC-like current path to be generated, which results in deterioration of the PSR characteristics of the power supply device 1. More specifically, the degree of deterioration of the PSR characteristics of the power supply device 1 varies depending on the magnitude of the parasitic capacitance Cp. Deterioration of PSR characteristics means an increase in the value of PSR, for example, and an improvement of PSR characteristics means decreasing the value of PSR, for example.

Furthermore, AC gain VGP0/VCCH, which is the ratio of the gate voltage VGP0 of the pass transistor Q1 to the input voltage VCCH, varies depending on the magnitude of the parasitic capacitance Cp. Broadening the band by making this AC gain VGP0/VCCH have a peak results in an improvement of the PSR characteristics. This, however, could cause the power-supply conductance of the power supply device 1 to decrease and the power supply device 1 to have negative power-supply conductance. Since the negative power-supply conductance causes oscillations of the input voltage VCCH of the input voltage node n1 and the output voltage Vout of the output voltage node n2, it is necessary to prevent the power supply device 1 from having negative power-supply conductance.

For this reason, in the power supply device 1 of the first embodiment, the AC path that is obtained by the AC path capacitance C2 is provided between the input voltage node n1 and the source of the NMOS transistor Q2*b* to prevent the power supply device 1 from having negative power-supply conductance while improving the PSR characteristics.

Figure 2:
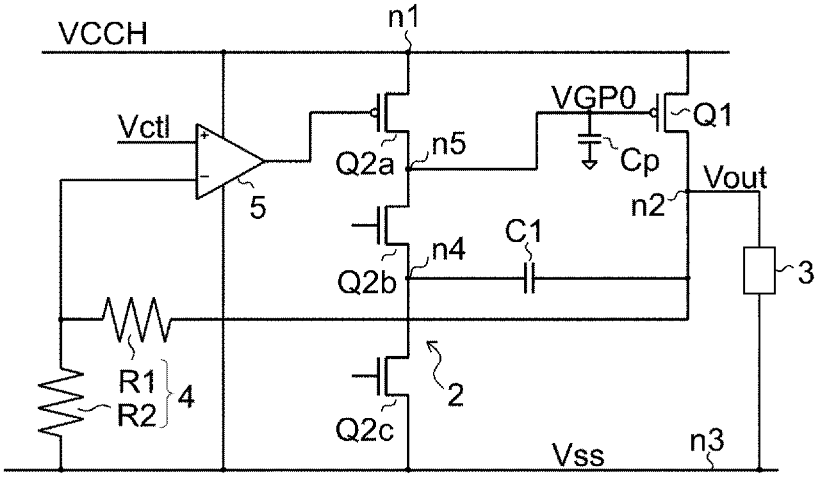
FIG. 2 is a circuit diagram of a power supply device according to a comparative example without an AC path.

FIG. 2 is a circuit diagram of a power supply device 100 according to a comparative example without the AC path that is obtained by the AC path capacitance C2. The power supply device 100 of the comparative example has a circuit configuration obtained by removing the AC path capacitance C2 from the power supply device 1 of the first embodiment.

Figure 3:
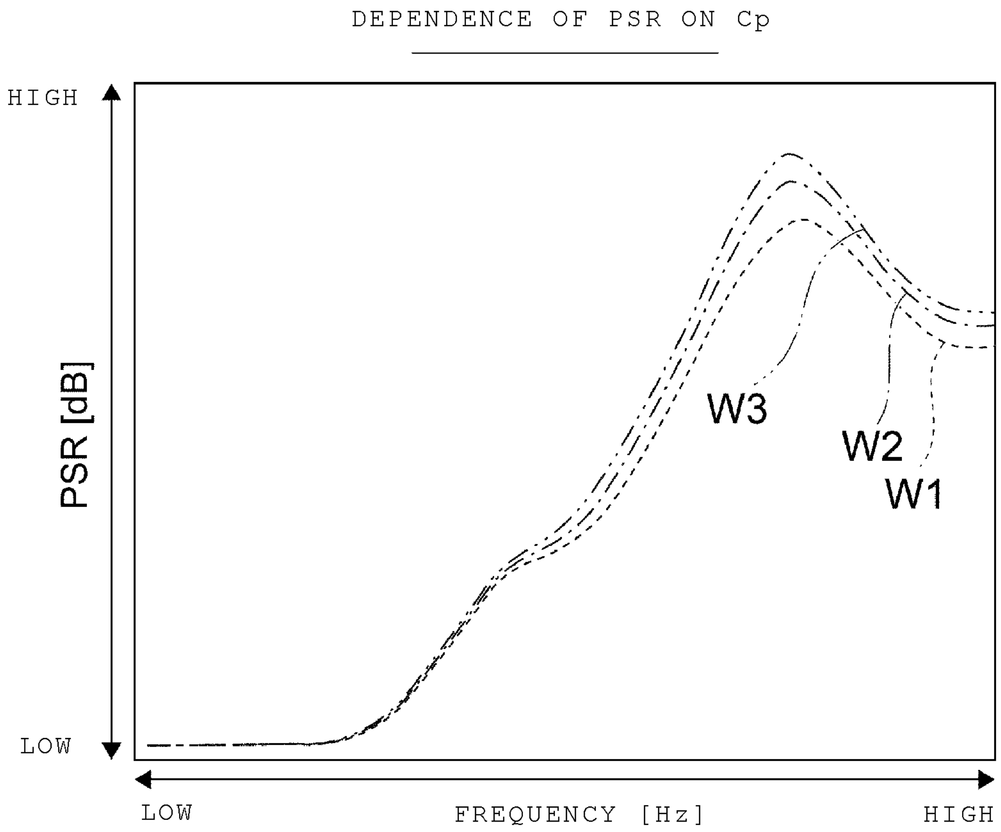
FIG. 3 is a diagram showing the PSR characteristics of the power supply device of FIG. 2.

FIG. 3 is a diagram showing the PSR characteristics of the power supply device 100 of the comparative example; specifically, FIG. 3 schematically shows the frequency characteristics of PSR. The horizontal axis of FIG. 3 represents the frequency [Hz] and the vertical axis represents PSR [dB]. FIG. 3 illustrates three curves W1 to W3 representing the PSR characteristics observed when the parasitic capacitance Cp of the gate of the pass transistor Q1 is changed in three ways. FIG. 3 shows the dependence of the PSR characteristics on the gate parasitic capacitance Cp. The value of the parasitic capacitance Cp for the curve W1<the value of the parasitic capacitance Cp for the curve W2<the value of the parasitic capacitance Cp for the curve W3. As shown in FIG. 3, the curve of the PSR characteristics changes to a greater value with an increase in the parasitic capacitance Cp. The curves W1 to W3 of FIG. 3 indicate that the larger the parasitic capacitance Cp, the higher the degree of deterioration of the PSR characteristics. As mentioned earlier, it is desirable to minimize PSR.

Making the AC gain VGP0/VCCH have a peak improves the PSR characteristics, but this could cause a shift of the power-supply conductance to the negative side and cause oscillations.

To address this problem, the power supply device 1 of the first embodiment is provided with the AC path that is obtained by the AC path capacitance C2. The capacitance value of the AC path capacitance C2 is optimized. This makes it possible to improve the PSR characteristics without a shift of the power-supply conductance to the negative side.

Figure 4:
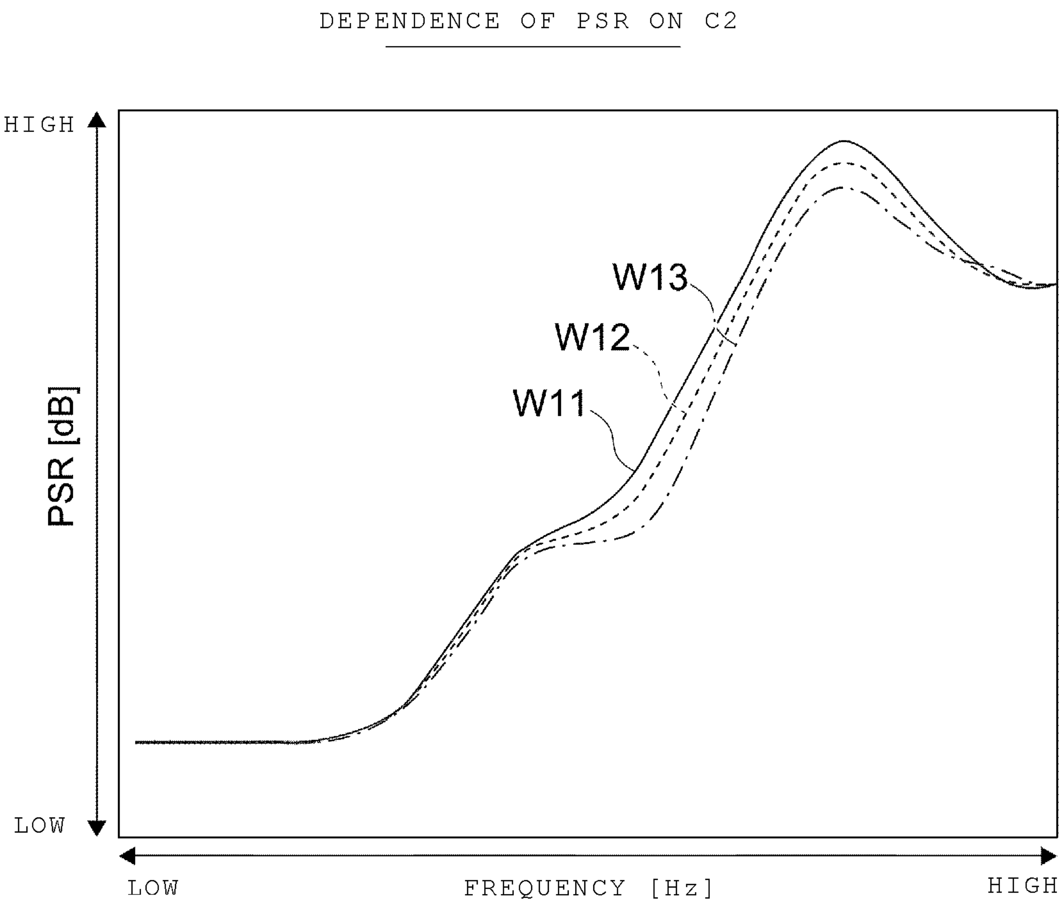
FIG. 4 is a diagram showing the PSR characteristics of the power supply device of FIG. 1.

FIG. 4 is a diagram showing the PSR characteristics of the power supply device 1 of the first embodiment; specifically, FIG. 4 schematically shows the frequency characteristics of PSR. The horizontal axis of FIG. 4 represents the frequency [Hz] and the vertical axis represents PSR [dB]. FIG. 4 illustrates three curves W1*l* to W13 representing the PSR characteristics observed when the capacitance of the AC path capacitance C2 is changed in three ways. FIG. 4 shows the dependence of the PSR characteristics on the AC path capacitance C2. The capacitance value of the AC path capacitance C2 for the curve W11<the capacitance value of the AC path capacitance C2 for the curve W12<the capacitance value of the AC path capacitance C2 for the curve W13. As shown in FIG. 4, the curve of the PSR characteristics changes to a smaller value with an increase in the capacitance value of the AC path capacitance C2. As is clear from the curves W1*l* to W13 of FIG. 4, the greater the capacitance value of the AC path capacitance C2, the lower the degree of deterioration of the PSR characteristics.

FIG. 4 shows an example in which the greater the capacitance value of the AC path capacitance C2, the lower the degree of deterioration of the PSR characteristics; it is not always possible to reduce deterioration of the PSR characteristics by making greater the capacitance value of the AC path capacitance C2. The capacitance value of the AC path capacitance C2 at which the value of the PSR characteristics is minimized exists, and making the capacitance value of the AC path capacitance C2 greater than that capacitance value causes the PSR characteristics to deteriorate.

In the power supply device 1 of the first embodiment, by selecting an appropriate capacitance value of the AC path capacitance C2, it is possible to improve the PSR characteristics without making the AC gain VGP0/VCCH have a peak.

As described above, in the power supply device 1 of the first embodiment, the AC path capacitance C2 is connected between a connection node between the mirror compensation capacitance C1 and the cascode connection circuit 2 and the input voltage node n1, and the capacitance value of the AC path capacitance C2 is optimized. This makes it possible to improve the PSR characteristics without a shift of the power-supply conductance of the pass transistor Q1 to the negative side. Thus, it is expected that the PSR characteristics are improved without the possibility of oscillations of the output voltage Vout that is output from the power supply device 1 of the first embodiment.

Second Embodiment

The power supply device 1 of FIG. 1 includes the differential amplifier circuit 5 separately from the cascode connection circuit 2; a cascode-type differential amplifier circuit 6 into which the cascode connection circuit 2 and the differential amplifier circuit 5 are integrated may be provided instead.

Figure 5:
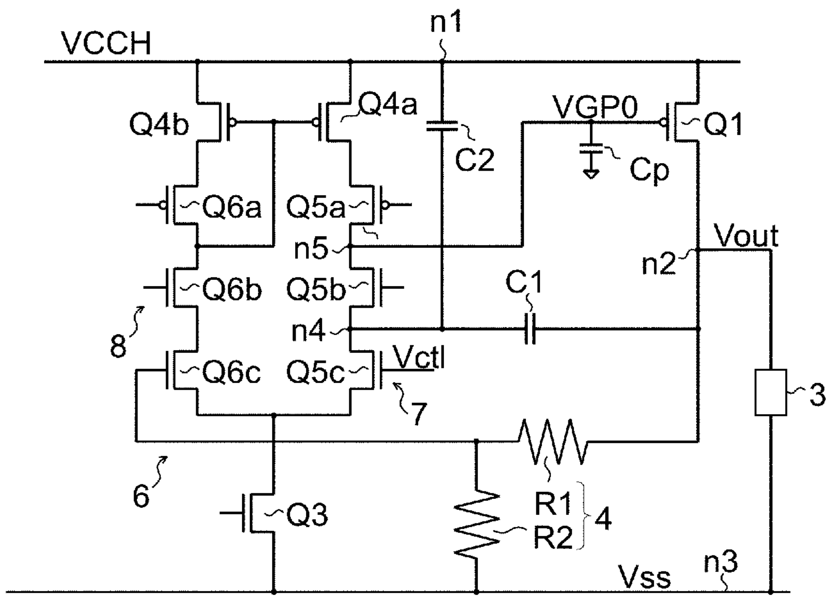
FIG. 5 is a circuit diagram of a power supply device according to a second embodiment.

FIG. 5 is a circuit diagram of a power supply device 1*a* according to a second embodiment. The power supply device 1*a* of FIG. 5 can be implemented as a semiconductor circuit 10*a* that is formed on a semiconductor substrate. The power supply device 1*a* includes a pass transistor Q1 (i.e., a first transistor Q1), a voltage divider circuit 4, the cascode-type differential amplifier circuit 6, a first capacitor C1 (also referred to as mirror compensation capacitance C1), and a second capacitor C2 (also referred to as AC path capacitance C2).

The cascode-type differential amplifier circuit 6 of FIG. 5 includes a transistor Q3 functioning as a current source, transistors Q4*a* and Q4*b* constituting a part of a current mirror circuit, transistors Q5*a*, Q5*b*, and Q5*c* that are connected in a cascode configuration, and transistors Q6*a*, Q6*b*, and Q6*c* that are connected in a cascode configuration. The transistors Q4*a*, Q4*b*, Q5*a*, and Q6*a* are PMOS transistors, for example, and the transistors Q3, Q5*b*, Q5*c*, Q6*b*, and Q6*c* are NMOS transistors, for example.

The sources of the transistors Q4*a* and Q4*b* are connected to an input voltage node n1. The transistors Q5*a*, Q5*b*, and Q5*c* are connected in a cascode configuration between the drain of the transistor Q4*a* and the drain of the transistor Q3. The transistors Q6*a*, Q6*b*, and Q6*c* are connected in a cascode configuration between the drain of the transistor Q4*b* and the drain of the transistor Q3.

In the following description, the transistors Q5*a*, Q5*b*, and Q5*c* are sometimes referred to as a first cascode connection portion 7, and the transistors Q6*a*, Q6*b*, and Q6*c* are sometimes referred to as a second cascode connection portion 8.

The gates of the transistors Q4*a* and Q4*b* are connected to each other, and the gates of the transistors Q4*a* and Q4*b* are connected to the drains of the transistors Q6*a* and Q6*b*. Therefore, the transistors Q4*a*, Q4*b*, Q5*a*, Q5*b*, Q5*c*, Q6*a*, Q6*b*, and Q6*c* constitute the current mirror circuit. A part of the current mirror circuit and the first cascode connection portion 7 correspond to the cascode connection circuit 2 of FIG. 1.

A divided voltage output from the voltage divider circuit 4 is supplied to the gate of the transistor Q6*c*. A control voltage Vctl is supplied to the gate of the transistor Q5*c*. By controlling the voltage level of the control voltage Vctl, it is possible to control the voltage level of an output voltage Vout of the power supply device 1*a*.

One end of the mirror compensation capacitance C1 is connected to an output node (also referred to as an output voltage node n2) of the power supply device 1*a* and the other end is connected to a connection node between the source of the transistor Q5*b* and the drain of the transistor Q5*c*. It is known that good PSR characteristics can be achieved by providing the mirror compensation capacitance C1, and the mirror compensation capacitance C1 is generally used in the LDO regulator. One of the features of the present embodiment is that the AC path capacitance C2 is additionally used in addition to the mirror compensation capacitance C1.

As in the case of FIG. 1, the AC path capacitance C2 is connected between the input voltage node n1 and the other end of the mirror compensation capacitance C1.

The cascode-type differential amplifier circuit 6 includes, between the input voltage node n1 and the drain of the transistor Q3, four transistors Q4*a*, Q5*a*, Q5*b*, and Q5*c* connected in a cascode configuration and four transistors Q4*b*, Q6*a*, Q6*b*, and Q6*c* connected in a cascode configuration; the number of stages at which the transistors connected in a cascode configuration are located is freely selected.

The other end of the mirror compensation capacitance C1 and the other end of the AC path capacitance C2 are connected to the source of the transistor Q5*b* in the first cascode connection portion 7, the transistor Q5*b* having the drain to which the gate of the pass transistor Q1 is connected. A connection node between the drain of the transistor Q5*a* and the drain (i.e., a fifth node n5) of the transistor Q5*b* is connected to the gate of the pass transistor Q1.

Also in the power supply device 1*a* of the second embodiment, by connecting the AC path capacitance C2 between the other end of the mirror compensation capacitance C1 and the input voltage node n1, it is possible to prevent the power-supply conductance of the pass transistor Q1 from shifting to the negative side while improving the PSR characteristics, which eliminates the possibility of oscillations of the output voltage Vout of the power supply device 1*a*. The power supply device 1*a* of the second embodiment can improve the PSR characteristics by providing the mirror compensation capacitance C1 in the cascode-type differential amplifier circuit 6 and, in addition thereto, achieve a further improvement of the PSR characteristics by providing the AC path capacitance C2, which eliminates the need to add an active element.

The semiconductor circuits 10 and 10*a* and the power supply devices 1 and 1*a* according to the first and second embodiments can be used as power supply circuits of various semiconductor chips, for example. Various circuits in a semiconductor chip can be driven by the output voltage Vout output from the semiconductor circuit 10 or 10*a* according to the first or second embodiment. The load current flowing through the load circuit 3 fluctuates depending on the operation state of the semiconductor chip. Moreover, the voltage level of the input voltage VCCH (for example, the power supply voltage) of the semiconductor circuit 10 or 10*a* fluctuates depending on environmental conditions and the like. Even when such fluctuations in the load current or the input voltage VCCH occur, by providing the AC path capacitance C2 in the semiconductor circuits 10 and 10*a* and optimizing the capacitance value thereof, it is possible to prevent oscillations of the output voltage Vout while improving the PSR characteristics.

Embodiments of the present disclosure are not limited to the above-described embodiments and include various modifications which a person skilled in the art can conceive, and the effects of the present disclosure are also not limited to those described above. In other words, various additions, changes, and partial deletions may be made without departing from the conceptual idea and spirit of the present disclosure that are derived from the subject matter recited in the claims and its equivalent.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A semiconductor circuit comprising:

a first transistor connected between a first node configured to input an input voltage and a second node configured to output an output voltage;

a cascode connection circuit including a plurality of second transistors connected in a cascode configuration between the first node and a third node set at a first voltage;

a first capacitor connected between the second node and a fourth node of a first one of the plurality of second transistors; and a second capacitor connected between the first node and the fourth node, wherein a fifth node of the first one of the second transistors is connected to a gate of the first transistor, wherein a gate voltage of the first transistor is controlled in accordance with a potential difference between a voltage correlated with the output voltage of the second node and a second voltage, the second voltage being lower than the input voltage and higher than the first voltage, wherein the semiconductor circuit further comprises:

a differential amplifier circuit including the cascode connection circuit; and a voltage divider circuit connected between the second node and the third node and configured to generate a divided voltage obtained by dividing the output voltage, wherein the differential amplifier circuit is configured to output a voltage in accordance with a potential difference between the divided voltage and the second voltage, wherein the gate voltage of the first transistor is controlled in accordance with the output voltage of the differential amplifier circuit, and wherein the differential amplifier circuit is configured to supply the voltage in accordance with the potential difference between the divided voltage and the second voltage to a gate of the second one of the second transistors.

2. The semiconductor circuit according to claim 1, wherein the differential amplifier circuit includes:

a current source that includes a third transistor;

a current mirror circuit that includes two fourth transistors with their gates connected to each other;

a first cascode connection portion including a plurality of fifth transistors connected in a cascode configuration between one of the fourth transistors and the third transistor; and a second cascode connection portion including a plurality of sixth transistors connected in a cascode configuration between the other of the fourth transistors and the third transistor, and wherein the cascode connection circuit includes the first cascode connection portion and a part of the current mirror circuit.

3. The semiconductor circuit according to claim 1, wherein the plurality of second transistors of the cascode connection circuit include a transistor of a first conductivity type and a transistor of a second conductivity type.

4. The semiconductor circuit according to claim 3, wherein a node to which a drain of the transistor of the first conductivity type of the plurality of second transistors and a drain of the transistor of the second conductivity type of the plurality of second transistors are commonly connected is connected to the gate of the first transistor.

5. The semiconductor circuit according to 1, wherein a capacitance value of the second capacitor is set in such a way that power-supply conductance of the first transistor does not shift to a negative side.

6. A power supply device comprising:

a first node configured to input an input voltage;

a second node configured to output an output voltage;

a third node set at a first voltage;

a first transistor connected between the first node and the second node;

a cascode connection circuit including a plurality of second transistors connected in a cascode configuration between the first node and the third node;

a first capacitor connected between the second node and a fourth node of a first one of the plurality of second transistors; and a second capacitor connected between the first node and the fourth node, wherein a fifth node of the first one of the second transistors is connected to a gate of the first transistor, wherein a gate voltage of the first transistor is controlled in accordance with a potential difference between a voltage correlated with the output voltage of the second node and a second voltage, the second voltage being lower than the input voltage and higher than the first voltage, wherein the power supply device further comprises:

a differential amplifier circuit including the cascode connection circuit; and a voltage divider circuit connected between the second node and the third node and configured to generate a divided voltage obtained by dividing the output voltage, wherein the differential amplifier circuit is configured to output a voltage in accordance with a potential difference between the divided voltage and the second voltage, and wherein the gate voltage of the first transistor is controlled in accordance with the output voltage of the differential amplifier circuit, wherein the differential amplifier circuit is configured to supply the voltage in accordance with the potential difference between the divided voltage and the second voltage to a gate of the second one of the second transistors.

7. The power supply device of claim 6, wherein the differential amplifier circuit includes:

a current source that includes a third transistor;

a current mirror circuit that includes two fourth transistors with their gates connected to each other;

a first cascode connection portion including a plurality of fifth transistors connected in a cascode configuration between one of the fourth transistors and the third transistor; and a second cascode connection portion including a plurality of sixth transistors connected in a cascode configuration between the other of the fourth transistors and the third transistor, and wherein the cascode connection circuit includes the first cascode connection portion and a part of the current mirror circuit.

8. The power supply device according to claim 6, wherein the plurality of second transistors of the cascode connection circuit include a transistor of a first conductivity type and a transistor of a second conductivity type.

9. The power supply device according to claim 8, wherein a node to which a drain of the transistor of the first conductivity type of the plurality of second transistors and a drain of the transistor of the second conductivity type of the plurality of second transistors are commonly connected is connected to the gate of the first transistor.

10. The power supply device according to to 6, wherein a capacitance value of the second capacitor is set in such a way that power-supply conductance of the first transistor does not shift to a negative side.

* * * * *